(12) United States Patent
Henderson et al.

(10) Patent No.: US 8,454,795 B1
(45) Date of Patent: Jun. 4, 2013

(54) SYSTEM AND METHOD FOR PRODUCING BONDED FIBER/CELLULOSE PRODUCTS

(76) Inventors: Mark J. Henderson, Grandville, MI (US); Akiva Pinto, Short Hills, NJ (US)

( * ) Notice: Subject to any disclaimer, the term of this patent is extended or adjusted under 35 U.S.C. 154(b) by 827 days.

(21) Appl. No.: 11/949,111

(22) Filed: Dec. 3, 2007

Related U.S. Application Data

(60) Provisional application No. 60/873,035, filed on Dec. 5, 2006.

(51) Int. Cl.
*D21H 11/14* (2006.01)
*D21H 21/14* (2006.01)
*D21B 1/04* (2006.01)
*D21B 1/08* (2006.01)

(52) U.S. Cl.
USPC ............... 162/159; 162/4; 162/24; 162/55; 162/141; 162/189; 241/24.1

(58) Field of Classification Search
USPC ............. 162/4, 9, 24, 55, 141, 146, 158, 159, 162/189; 241/24.1
See application file for complete search history.

(56) References Cited

U.S. PATENT DOCUMENTS

| | | |
|---|---|---|
| 1,898,759 A | 2/1933 | Burt, Jr. |
| 2,026,732 A | 1/1936 | Farley |
| 2,355,358 A | 8/1944 | Anderson |
| 2,517,903 A | 8/1950 | Luhrmann |
| 2,550,354 A | 4/1951 | Jacobsen |
| 2,910,250 A | 10/1959 | Fisher |
| 2,940,134 A | 6/1960 | Heritage |
| 2,989,252 A | 6/1961 | Babb |
| 3,051,398 A | 8/1962 | Babb |
| 3,061,206 A | 10/1962 | Matter |
| 3,135,561 A | 6/1964 | Kempthorne |
| 3,529,870 A | 9/1970 | Woten |
| 3,741,863 A | 6/1973 | Brooks |
| 3,772,739 A | 11/1973 | Lovgren |
| 3,807,646 A | 4/1974 | Leiter et al. |
| 3,861,599 A | 1/1975 | Waggoner |
| 4,083,475 A | 4/1978 | Venner et al. |
| 4,087,316 A * | 5/1978 | Jividen et al. ............... 162/14 |
| 4,111,493 A | 9/1978 | Sperber |
| 4,111,730 A * | 9/1978 | Balatinecz ............... 264/113 |
| 4,184,311 A * | 1/1980 | Rood ............... 53/434 |
| 4,210,487 A * | 7/1980 | Driscoll ............... 162/146 |
| 4,236,654 A | 12/1980 | Mello |
| 4,273,296 A | 6/1981 | Hoshall |
| 4,318,797 A * | 3/1982 | Jager et al. ............... 208/417 |
| 4,344,580 A | 8/1982 | Hoshall et al. |

(Continued)

FOREIGN PATENT DOCUMENTS

EP 0599812 B1 12/1997
WO WO 2005/042859 A1 5/2005

OTHER PUBLICATIONS

Statement by Mark J. Henderson, May 16, 2006.

*Primary Examiner* — Mark Halpern
*Assistant Examiner* — Dennis Cordray
(74) *Attorney, Agent, or Firm* — Gardner, Linn, Burkhart & Flory, LLP

(57) ABSTRACT

A system for forming bonded fiber/cellulose products includes a shredded paper particle manufacturing line producing shredded paper particle-based products, such as insulation, a bonded fiber/cellulose product line, and a collector for collecting a portion of the shredded paper particles generated by the shredded paper particle line for the bonded fiber/cellulose product line.

31 Claims, 7 Drawing Sheets

U.S. PATENT DOCUMENTS

| | | | |
|---|---|---|---|
| 4,411,390 A | 10/1983 | Woten | |
| 4,465,239 A | 8/1984 | Woten | |
| 4,560,307 A | 12/1985 | Deitesfeld | |
| 4,590,114 A | 5/1986 | Holtman | |
| 4,647,324 A | 3/1987 | Mtangi et al. | |
| 4,869,950 A | 9/1989 | Elsen et al. | |
| 4,931,005 A | 6/1990 | Tanaka et al. | |
| 4,978,252 A | 12/1990 | Sperber | |
| 5,025,533 A | 6/1991 | Faas et al. | |
| 5,177,279 A * | 1/1993 | Harandi | 585/312 |
| 5,316,601 A | 5/1994 | Hebbard et al. | |
| 5,455,065 A * | 10/1995 | Rood | 427/203 |
| 5,476,711 A | 12/1995 | Hebbard et al. | |
| 5,491,186 A | 2/1996 | Kean et al. | |
| 5,516,580 A | 5/1996 | Frenette et al. | |
| 5,554,238 A | 9/1996 | English | |
| 5,612,129 A * | 3/1997 | Karhuketo et al. | 428/323 |
| 5,679,145 A | 10/1997 | Andersen et al. | |
| 5,829,649 A | 11/1998 | Horton | |
| 5,841,081 A | 11/1998 | Thompson et al. | |
| 5,910,367 A | 6/1999 | Kean et al. | |
| 6,024,818 A | 2/2000 | Dunson et al. | |
| 6,039,821 A | 3/2000 | Buck | |
| 6,263,545 B1 | 7/2001 | Pinto | |
| 6,276,028 B1 | 8/2001 | Pinto | |
| 6,421,884 B2 | 7/2002 | Pinto | |
| 6,460,223 B1 | 10/2002 | Pinto | |
| 6,475,315 B1 | 11/2002 | Kean et al. | |
| 6,503,026 B1 | 1/2003 | Mitchell | |
| 6,752,336 B1 | 6/2004 | Wingard | |
| 7,032,273 B2 | 4/2006 | Pinto | |
| 7,098,269 B2 | 8/2006 | Lyons et al. | |
| 7,405,248 B1 | 7/2008 | Troger et al. | |
| 2002/0060014 A1 * | 5/2002 | Sipila et al. | 162/189 |
| 2003/0008586 A1 | 1/2003 | Kajander et al. | |
| 2003/0060113 A1 | 3/2003 | Christie et al. | |
| 2004/0028958 A1 | 2/2004 | Assink et al. | |
| 2004/0124262 A1 | 7/2004 | Bowman et al. | |
| 2004/0185731 A1 | 9/2004 | McGuire | |
| 2006/0000155 A1 * | 1/2006 | Wagner | 52/22 |
| 2007/0017649 A1 * | 1/2007 | Tamai et al. | 162/289 |
| 2008/0233381 A1 * | 9/2008 | Sellars et al. | 428/301.4 |

* cited by examiner

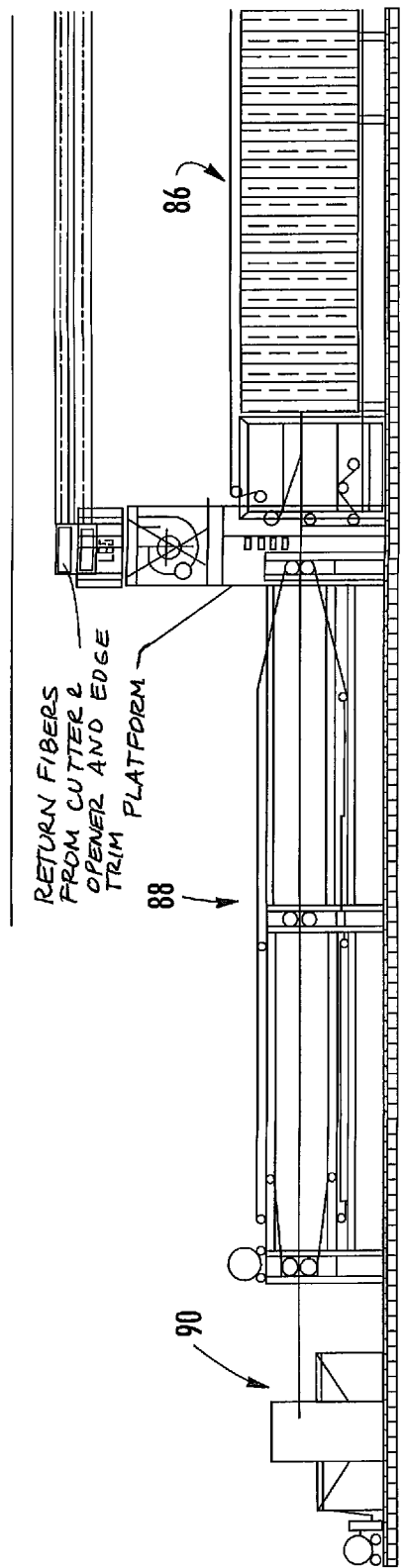

SYSTEM AND METHOD FOR PRODUCING BONDED FIBER/CELLULOSE PRODUCTS

This application claims priority from U.S. provisional application Ser. No. 60/873,035, filed Dec. 5, 2006, entitled SYSTEM FOR PRODUCING CELLULOSE INSULATION AND FIBER MATERIAL, which is incorporated by reference herein in its entirety.

BACKGROUND AND FIELD OF THE INVENTION

The present invention relates to a system and process for manufacturing bonded fiber/cellulose products, such as batts or panels, which are suitable for use as thermal and/or sound insulation batts, mats or panels in buildings and manufactured products.

SUMMARY OF THE INVENTION

The present invention provides a system and process for forming bonded fiber/cellulose products, such as batts, mats or panels, using an in-process production and delivery process in which shredded paper particles, which are used in forming the bonded fiber/cellulose products, are delivered in loose form from a shredded paper particle manufacturing system and, further, optionally delivered with known components, which provides for greater cost and quality control over conventional bonded fiber/cellulose manufacturing process.

In one form of the invention, a system for forming bonded fiber/cellulose products includes a shredded paper particle manufacturing line producing shredded paper particle-based products, such as insulation, a bonded fiber/cellulose product line, and a collector for collecting a portion of the shredded paper particles generated by the shredded paper particle line for the bonded fiber/cellulose product line.

In one aspect, the bonded fiber/cellulose product line includes a supply of bonding material and a blender, which blends controlled amounts of the bonding material and of the shredded paper particles into a blend. The bonded fiber/cellulose product line further includes a mixer, which then mixes controlled amounts of the blend. In addition, the system includes a forming station, which forms bonded fiber/cellulose products from controlled amounts of the mixed blend.

In a further aspect, the forming station includes a forming apparatus for forming a continuous batt from controlled amounts of the mixed blend and an oven, which heats the batt. In yet a further aspect, the forming station includes a compression apparatus that compresses the heated batt to thereby form a bonded fiber/cellulose product with a desired thickness or density.

In another aspect, the collector comprises a pneumatic collector, such as a fan.

In yet a further aspect, the shredded paper particle line includes a recycled paper supply, one or more de-balers, and a pre-shredder and a shredder, which shred the paper. In addition, the shredded paper particle line includes a supply of fire retardant material, which is blended with the shredded paper to form a paper and fire retardant mixture.

According to yet a further aspect, the shredded paper particle line includes a second shredder or a refiner for further shredding or fiberizing the paper and fire retardant mixture to thereby form the shredded paper particles. In addition, the shredded paper particle line may include a supply of fluid, such as water and/or steam, which is introduced into the shredded paper and fire retardant mixture.

Other aspects include a metering and weighing device for metering and weighing the shredded paper particles after the shredded paper particles are transported to the bonded fiber/cellulose product line.

The bonding material may include bonding fibers and/or structural fibers.

In another form of the invention, a system for forming a bonded fiber/cellulose product includes a shredded paper particle line, with a supply of recycled paper, one or more pre-shredders for shredding paper, and a supply of fire retardant material delivering fire retardant characteristics to the shredded paper. The system further includes a second shredder or refiner for shredding or fiberizing the partially shredded paper and the fire retardant mixture to form shredded paper particles. The system also includes a bonded fiber/cellulose product line with a blender and a supply of bonding materials, such as fibers. A collector collects a portion of the shredded paper particles at the bonded fiber/cellulose product line. The blender blends a controlled amount of the bonding material with a controlled amount of the shredded paper particles. The system also includes a mixer for mixing the blend of shredded paper particles and bonding material and a forming apparatus for forming a continuous batt from a controlled amount of the mixture from the mixing apparatus. The bonded fiber/cellulose product line further includes an oven to heat the batt formed by the forming apparatus and a compression apparatus for compressing the heated batt to thereby form a bonded fiber/cellulose product with a desired thickness or density.

In a further aspect, the shredded paper particle line may include a supply of fluid, such as water and/or steam, for introducing the fluid into the shredded paper particles to form conditioned shredded paper particles, with a portion of which is transported to the bonded fiber/cellulose product line.

In another aspect, the bonded fiber/cellulose product line includes a conveyor, a shredded paper particle weighing device, and a bonding material weighing device, with the collector collecting the portion of shredded paper particles at the shredded paper particle weighing device. The bonding material weighing device delivers controlled amounts of the bonding material to the conveyor, and with the shredded paper particle weighing device delivering controlled amounts of the shredded paper particles onto the controlled amounts of the bonding material to form a stack, which is then blended by the blender.

According to another form of the invention, a method for manufacturing bonded fiber/cellulose products includes forming shredded paper particles in a shredded paper particle production line, diverting a portion of the shredded paper particles from the shredded paper particle production line to a bonded fiber/cellulose product line, providing bonding material, and blending a controlled amount of the shredded paper particles with a controlled amount of the bonding material to form a blend. Measured amounts of the different components are mixed together to form a mixture. A continuous batt is then formed from a controlled amount of the mixture, which is thereafter heated to a temperature above the melting temperature of the bonding material and compressed to form a bonded fiber/cellulose product with a desired thickness or density.

In one aspect, the shredded paper particles are formed as conditioned shredded paper particles, and optionally conditioned shredded paper particles with a fire retardant component. The conditioned shredded paper particles contain an increased percentage of moisture content from the addition of steam and/or fluid, such as water.

In another aspect, the bonding material may include bonding fibers and/or structural fibers.

According to another aspect, the shredded paper particles are formed by shredding paper and mixing a controlled amount of the shredded paper with a fire retardant agent. Thereafter, the paper and fire retardant mixture are further shredded or fiberized.

In a further aspect, a fluid, such as water and/or steam, may be added to the shredded or fiberized paper and fire retardant mixture to form conditioned shredded paper particles, a portion of which is blended with the controlled amount of bonding material.

Accordingly, the present invention provides an in-process production and delivery system in which shredded paper particles that are used to form the bonded fiber/cellulose product are delivered in a loose form from an upstream shredded paper particle product line and, optionally, in a conditioned loose form. Further, the shredded paper particles may comprise conditioned shredded paper particles with a fire retardant component, which can create efficiencies in the process and hence a reduction in costs.

These and other objects, advantages, purposes, and features of the invention will become more apparent from the study of the following description taken in conjunction with the drawings.

DETAILED DESCRIPTION OF THE DRAWINGS

FIG. 3C is an enlarged elevation view of the heating and compressing section of the bonded fiber/cellulose product line of FIG. 3.

DETAILED DESCRIPTION OF THE PREFERRED EMBODIMENTS

Figure 1:
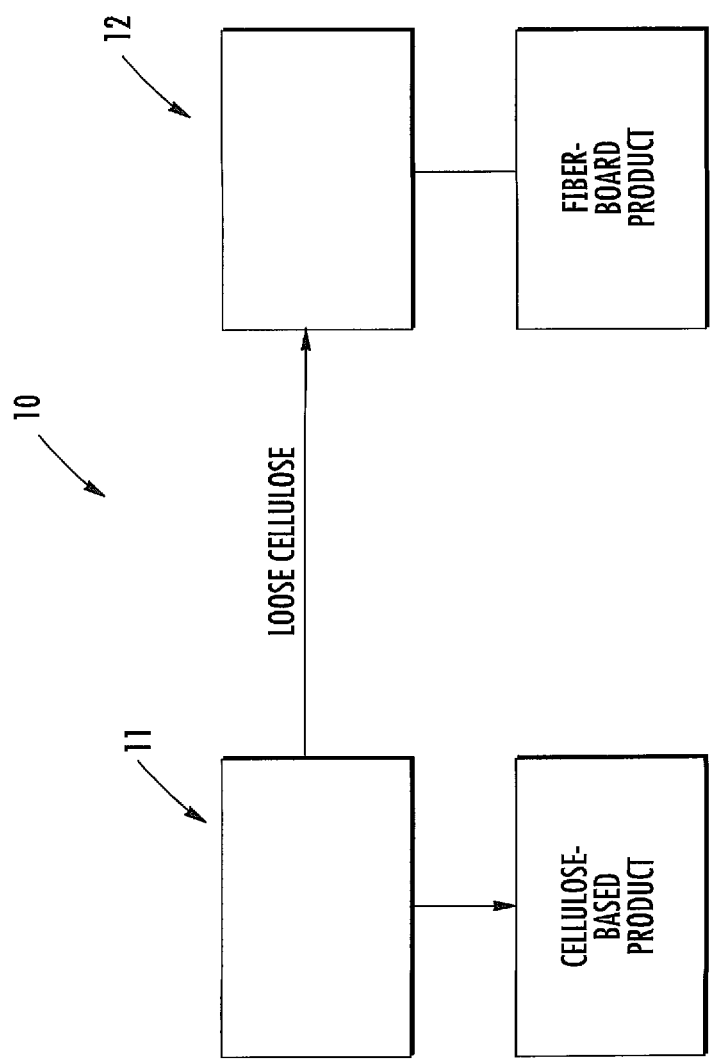
FIG. 1 is a schematic layout of the manufacturing system of the present invention.

Referring to FIG. 1, the numeral 10 generally designates the manufacturing system of the present invention for forming bonded fiber/cellulose products. System 10 includes a shredded paper particle leg or line 11, which produces shredded paper particles, for example, for making insulation, and a bonded fiber/cellulose product leg or line 12 to form the bonded fiber/cellulose products. Shredded paper particle line 11 is configured to divert a portion of the shredded paper particles to the bonded fiber/cellulose product line to thereby form an in-process production and delivery system and process. As will be more fully described below, shredded paper particle leg 11 produces shredded paper particles with a generally known material composition and moisture content, which is then diverted to bonded fiber/cellulose product line 12, which can reduce the cost of manufacturing the bonded fiber/cellulose products by potentially reducing the quantity of bonding material and fire retardant that may be needed in the bonded fiber/cellulose product manufacturing process. In addition, the just-in-time process further reduces costs by eliminating the costs associated with packaging, shipping, unpackaging, and opening bales of shredded paper particles, which are currently used in conventional bonded fiber/cellulose products manufacturing processes. Furthermore, by eliminating the use of closed bales of shredded paper particles, which need to be shipped, unpackaged, and opened, as noted, the present system provides a fully automated shredded paper particle delivery system.

Figure 2:
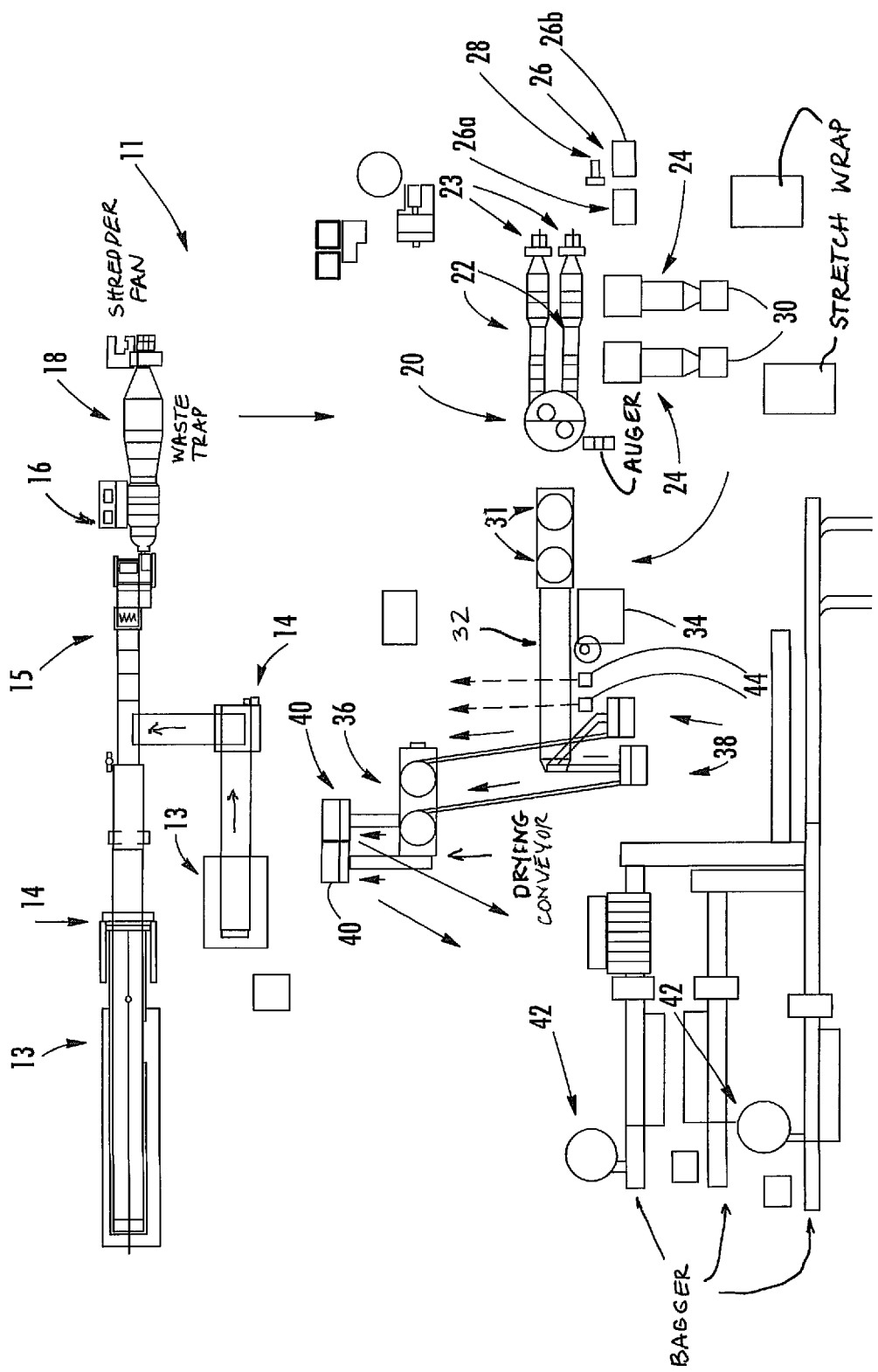
FIG. 2 is a layout drawing of a shredded paper particle line of the manufacturing system of the present invention, which produces insulation.

Referring to FIG. 2, shredded paper particle line 11 of manufacturing system 10 includes one or more input conveyors 13, which conveys paper on demand to one or more de-balers 14, a pre-shredder 15, a shredder 16, such as a hammer-mill, to pre-shred the paper. The paper is typically recycled paper, such as newspapers or other paper products. The pre-shredded paper is then transported or transferred, for example, pneumatically moved (see arrow in FIG. 2), to a surge bin or meter bin 20, where the pre-shredded paper is delivered in measured quantities to augers 22. The pre-shredded paper is then moved by augers 22 and fans 23 to final shredders or refiners 24. Shredders or refiners 24 preferably comprise finish mills that incorporate two sets of two opposed, rotating grinding surfaces with the outside surfaces being stationary. For example, the surfaces may consist of sixteen plates per disk with thirty-six grinds per segment.

Before the pre-shredded paper is shredded at the final shredders 24, fire retardant material is introduced, for example augered, into the pre-shredded paper from individual compartmentalized hoppers 26 so that the paper and fire retardant materials are processed jointly at the final shredders or refiners 24, whose output is shredded paper particles. Each hopper 26a and 26b may be individually controlled for material output, which is processed through a material pulveriser 28 before being added into the paper.

Each shredder or refiner 24 includes a transfer device, such as a fan 30, which moves the shredded paper particles through cyclones 31 to a steam conveyor 32, as generally shown by the arrow in FIG. 2. It is at this point that wet fungicides, such as Disodium Octaborate Tetrahydrate, may be added. The steam conveyor 32 is charged from its lower or bottom side with steam jets, with an electric boiler 34 supplying the steam. The conditioned shredded paper particles are then transported from steam conveyor 32 to a series of cyclones 36 using conveyor fans 38, where the paper/fire retardant mixture or shredded paper particles lose some moisture content. The shredded paper particles are then transferred, for example pneumatically transferred by fans 40, to bagging stations 42 where the shredded paper particles are then bagged in their final form, which can be used as insulation. Though described in the context of an insulation manufacturing system, shredded paper particles can be harvested or diverted from any shredded paper particle producing system.

To provide the just-in-time bonded fiber/cellulose product system of the present invention, a portion of the shredded paper particles produced in shredded paper particle line 11 is diverted to bonded fiber/cellulose product line 12. In addition to conveyor fans 38, system 10, therefore, includes one or more transfer devices or transporters, such as fans 44, which divert a portion of the loose, conditioned shredded paper particles conveyed on the steam conveyor to bonded fiber/cellulose product line 12.

Figure 3:
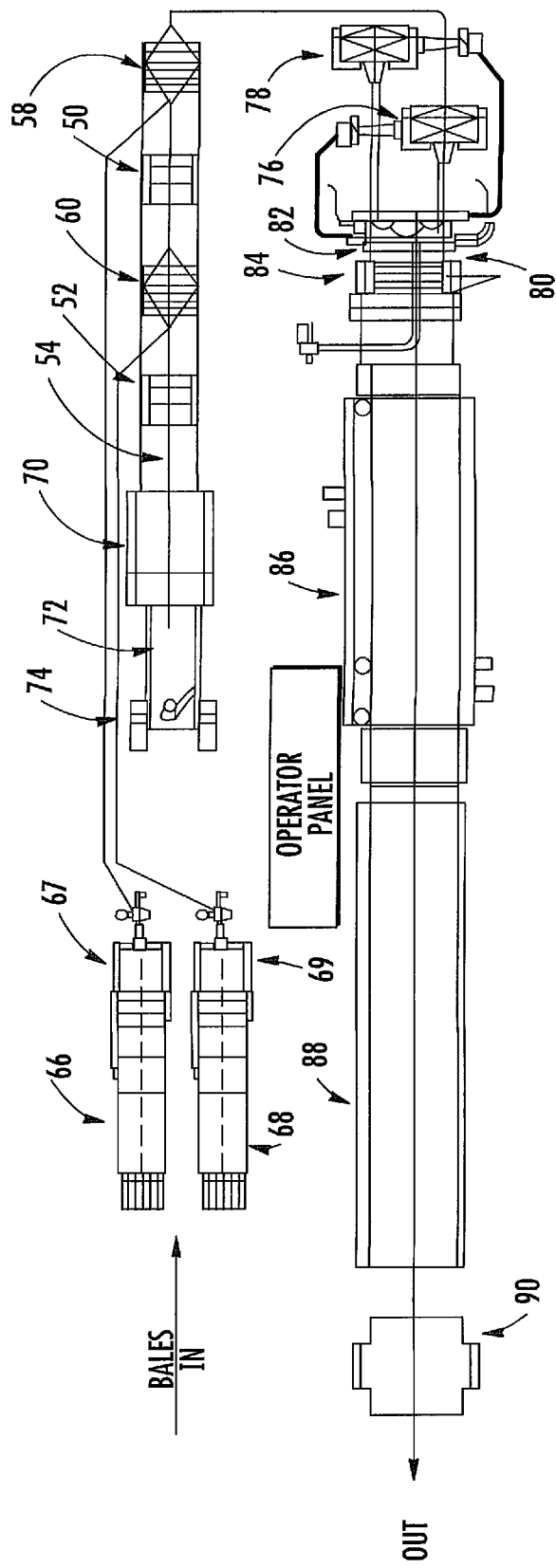
FIG. 3 is a layout of a bonded fiber/cellulose product line of the manufacturing system that receives shredded paper particles from the shredded paper particle line of FIG. 2.

Referring to FIG. 3, bonded fiber/cellulose product line 12, also referred to as the bonded fiber/cellulose product leg, receives the blown-in shredded paper particles, which contain a higher than normal moisture content from the fluid and/or steam that was added at the steam conveyor 32 of the shredded paper particle line 11. For example, the percentage of moisture in the shredded paper particles at the steam conveyor 32 may range from about 11% to 13%, which is in contrast to the normal moisture content in the range of about 8% associated with conventional shredded paper particle manufacturing systems. By using conditioned shredded paper particles, the evaporation of the fire retardant materials in the shredded paper particles is reduced. Consequently, the amount of fire retardant materials added in the bonded fiber/cellulose product forming process may be reduced, or not needed at all. If additional fire retardant materials need to be added in the bonded fiber/cellulose product forming process, they may be added in conveyor 54, prior to the materials entering blender 70.

The bonded fiber/cellulose products are formed from shredded paper particles, bonding material, including bonding fibers (which act as an adhesive) and/or structural fibers, or other optional bonding materials other than fibers and/or outer finish material. The bonding material bonds the shredded paper particles together. The bonding fibers typically comprise about 5% to 25% of the bonded fiber/cellulose product and have diameters from about 1.5 to 66 denier and are preferably a synthetic fiber, such as a bi-component, that at least partially melts during the forming process.

The structural fibers may constitute from about 0% to 30% of the product and may be natural or synthetic and may be formed from a polymer, such as thermoplastic polymer, such as polyester, that has a higher melting point than that of the temperatures used in this process. Suitable natural fibers may include jute, hemp, wool, cotton, or the like. As will be noted below, in some cases where the quality of paper that is input into the shredded paper particle line is high, no structural fibers may be needed. The shredded paper particles comprise about 5% to 95% of the product.

Figure 3A:
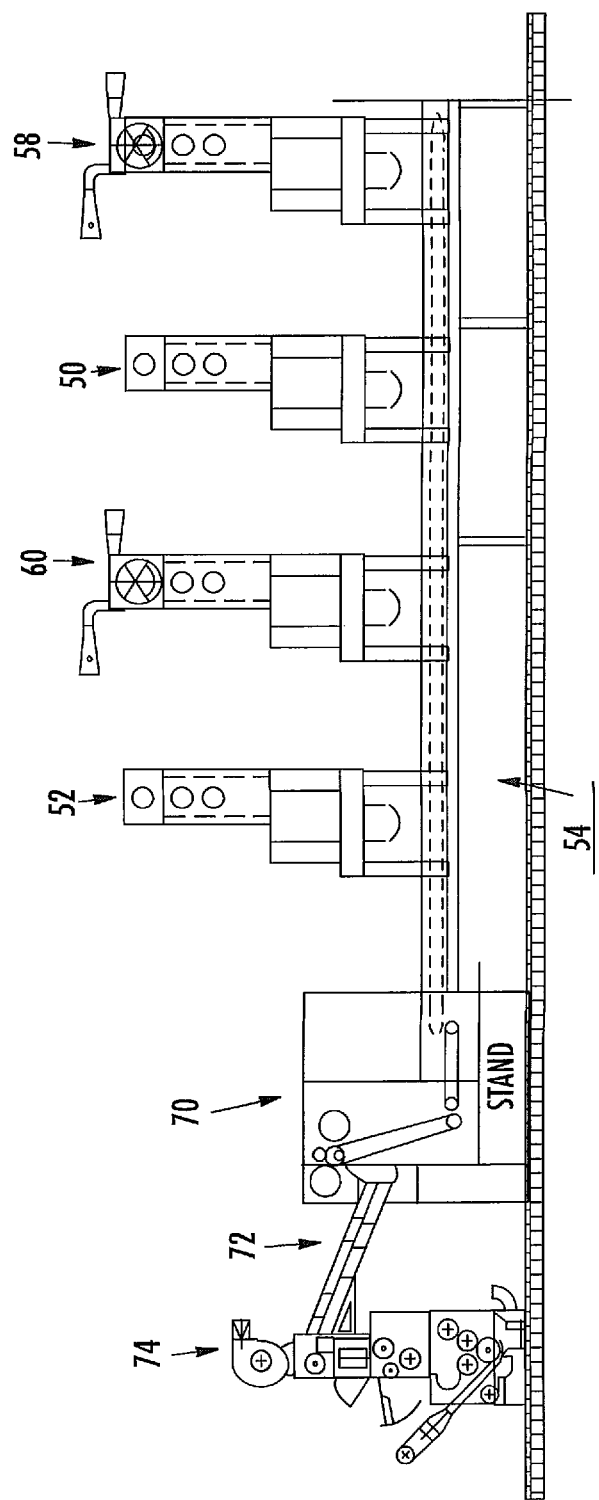
FIG. 3A is an enlarged elevation view of the shredded paper particle and bonding material section of the bonded fiber/cellulose product line of FIG. 3.
Figure 3B:
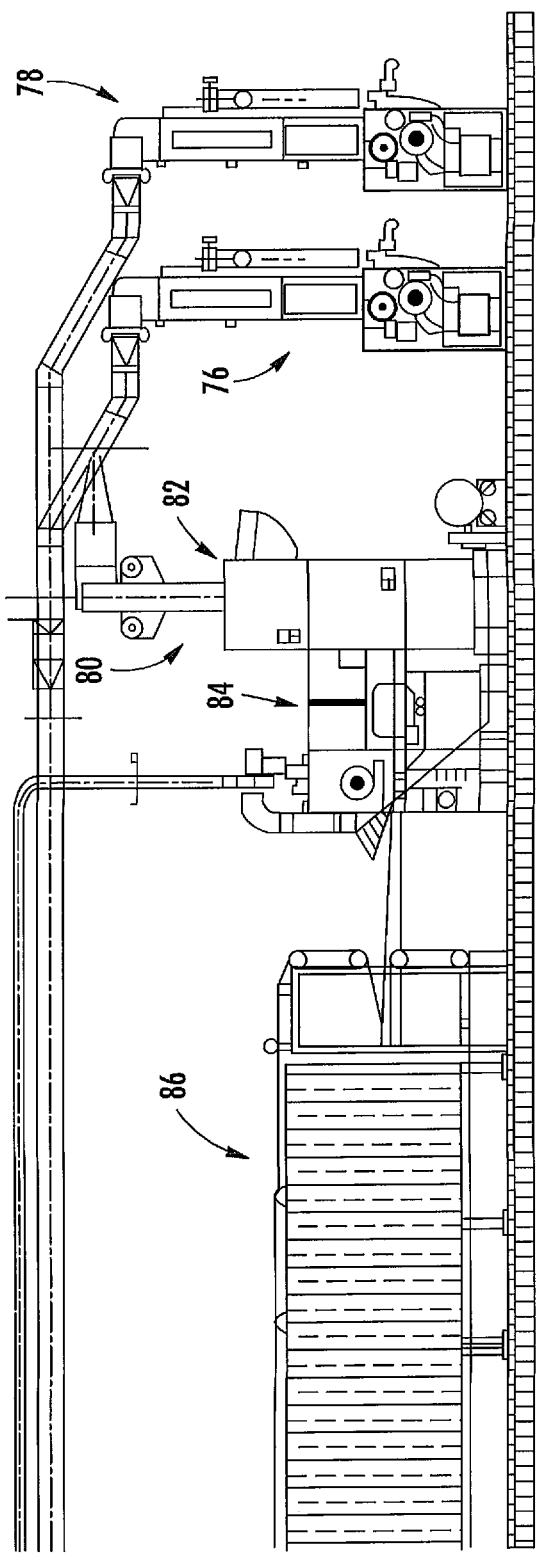
FIG. 3B is an enlarged elevation view of the mixing and forming section of the bonded fiber/cellulose product line of FIG. 3.

Referring to FIGS. 2, 3, and 3A, the shredded paper particles are blown into shredded paper particle metering and weighing devices 50 and 52, which include agitators to keep the shredded paper particles in their fluffed or aerated condition. Devices 50 and 52 additionally include weigh pans, which are controlled by a control system, such as a PLC-based control system. Devices 50 and 52 deposit the shredded paper particles onto a conveyor 54, such as conveyor belt, in controlled amounts. Also deposited onto conveyor 54 are the bonding material, namely the bonding fibers and/or structural fibers as noted above, which may have different lengths, denier, and may be straight or crimped fibers. To introduce the bonding material onto conveyor 54, system 12 includes bonding material weighing and metering devices 58 and 60, which weigh and then deposit the appropriate amounts of the bonding material onto the conveyor 54 in stacks. The bonding material is delivered, for example pneumatically delivered, to devices 58 and 60 from bale openers 66 and 68, which initially open the bales of bonding material through spiked inclined conveyors, and fine openers 67 and 69, which further open the bonding material. The bale openers may have the same or different materials and allow some mixing of the materials. As noted above, the materials are then delivered, for example pneumatically, to devices 58 and 60.

The bonding material, such as the fibers (structural and bonding), is deposited on conveyor 54 in programmed and electronically controlled precise amounts by devices 58 and 60. The shredded paper particles are similarly deposited onto conveyor 54 in a programmed and electronically controlled amount on top of the bonding material, e.g. the structural and bonding fibers, by weigh shoots 50, 52. The stacked bonding material is then delivered by conveyor 54 to a blender 70 where the bonding material and shredded paper particles are tumbled using a spiked inclined conveyor. A fluid, such as water, or an atomized mist may be applied to the material on conveyor 54, which may help fire retardant material adhesion and reduce static.

Blender 70 initiates mixing and drops metered mounts of the shredded paper particles and bonding material mixture onto a second conveyor 72 that delivers the mixture to an opening and fine mixing machine 74, such as the mixing machine available under the trade name BemaOpener from Bettarini & Serafini (Bematic) of Italy. An optional second opening and mixing machine, such as the mixing machine described in U.S. Pat. No. 7,032,273, which is herein incorporated by reference in its entirety, may be added to bonded fiber/cellulose product line 12 downstream of mixing machine 74. After being mixed by the mixing machine (or machines), the mixed material is then conveyed, such as pneumatically conveyed, to metering and opening machines 76 and 78. Suitable metering and opening machines are available under the trade name BemaBlow also from Bematic of Italy.

Metering and opening machines 76 and 78 meter the material and provide a precise flow of the blended mixture to the forming station 80. Forming station 80 includes a forming machine 82, such as a BemaFormer, also from Bematic of Italy, where the blended mixture is formed into a continuous batt. Once formed into a batt, the batt is then conveyed over a scale or weighing machine 84, such as the Bema Multi Scale, and then to a hot air bonding oven 86, such as a bonding oven from Bombi Meccanica (Bombi) of Italy. Thereafter, the batt is transferred to a thermal gauging machine 88, such as a hyper compression unit from Bombi, which is a compression apparatus, which first uses the heat and then cooling to compress the batt to a desired thickness or density. Thereafter, the batt is sized and cut and packaged at a cutter and package station 90. The trimmings that are produced during the sizing and cutting step may be collected and transferred back to the metering machines 76 and 18 so that they can be reintroduced and recycled into the process.

As noted above, the bonding material and shredded paper particles and blends or mixtures thereof are transported using a pneumatic system and typically by a pneumatic system with a network of conduits. Optionally, dirty air that is generated during the process is separated from all pneumatically moved bonding material and shredded paper particles through a dust collector, such as a Pneumafil belt dust collector, in an adjacent area or building. Material collected in the dust collector may be recycled back into the system, and clean air exhausted through a vent, for example in the roof of the adjacent building.

Figure 4:
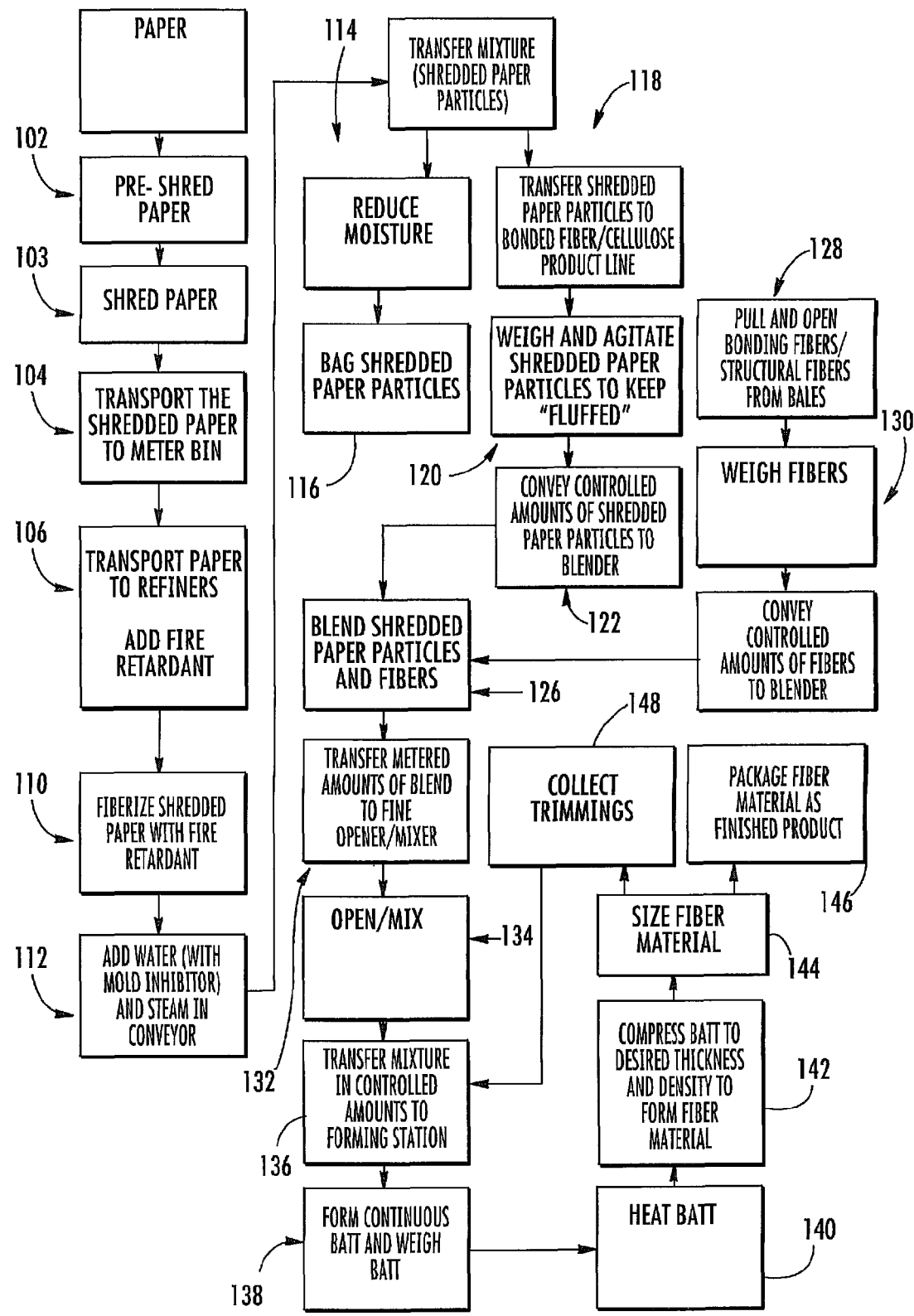
FIG. 4 is a flowchart of the process steps for the shredded paper particle line and the bonded fiber/cellulose product line of the manufacturing process.

Referring to FIG. 4, the shredded paper particle line process includes pre-shredding (102) and shredding the paper (103), which is then transported to the metering machine where the shredded paper is metered (104). Thereafter, the shredded paper is transported to the refiners and fire retardant is added to the shredded paper (106). The shredded paper along with the fire retardant is then shredded or fiberized (110) to thereby form the shredded paper particles. Thereafter, a fluid, such as water, and/or steam is applied to the shredded or fiberized paper and fire retardant material (112). The bulk of the shredded paper particles, which are formed, then has reduced moisture content (114) and is thereafter bagged (116) for use as insulation. A portion of the shredded paper particles is transferred or diverted to the bonded fiber/cellulose product line (118). The shredded paper particles are then weighed and agitated to keep the shredded paper particles fluffed or aerated (120). The shredded paper particles are then conveyed to the blender (122) where they are blended with the structural fibers and/or bonding fibers (bonding material) (126), which were pulled from bales and thereafter opened (128) and then weighed (130), with controlled amounts conveyed to the blender for blending with the shredded paper particles (126). Metered amounts of the shredded paper particles and bonding material blend are then transferred to a mixer (132) where the blend is then mixed (134). Controlled amounts of the mixture are then transferred to the forming station (136), where the mixture is then formed into a continuous batt and then weighed (138). After the batt is formed and weighed, the batt is heated (140) and then compressed (142) to achieve the desired thickness or density of the bonded fiber/cellulose products. Once compressed, the products are then cut or slit to size (144) and then packaged (146). The edge trimming may be collected (148) and returned to the bonded fiber/cellulose product forming process, for example.

As previously noted, in conventional batt or panel manufacturing systems, shredded paper particles are delivered in bales, which need to be unpackaged and then opened from their compressed form. In contrast, the present invention provides an in-process production and delivery process in which the shredded paper particles are delivered in loose form and, further, optionally in a moist or damp state, which as noted above, may reduce the amount of fire retardant material needed to be added to the bonded fiber/cellulose product line system. Further, by integrating a shredded paper particle producing line with a bonded fiber/cellulose product line, the quality of the paper used to form the shredded paper particles can be controlled by using specific types of paper, which may reduce, if not eliminate, the amount of bonding material needed in the bonded fiber/cellulose product line. Some paper products may already have a bonding agent, which could also reduce the amount of the bonding material that needs to be added during the bonded fiber/cellulose product manufacturing process. Alternately or in addition, the quality of the shredded paper particles, which is the main component of the bonded fiber/cellulose product, can be monitored using near infrared radiation tools.

While one form of the invention has been shown and described, other forms will now be apparent to those skilled in the art. Therefore, it will be understood that the embodiment shown in the drawings and described above is merely for illustrative purposes, and is not intended to limit the scope of the invention which is defined by the claims which follow as interpreted under the principles of patent law including the doctrine of equivalents.

The embodiments of the invention in which we claim an exclusive property right or privilege are defined as follows:

1. A method of producing both loose cellulose insulation and bonded fiber/cellulose insulation products utilizing shredded paper particles comprising:

making shredded paper particles in a shredded paper particle line that includes a steam operation, said making shredded paper particles including shredding paper to form shredded paper particles, adding fire retardant material in the shredded paper particle line, and applying heated steam to the shredded paper particles at the steam operation whereby the shredded paper particles are moistened;

diverting a portion of the shredded paper particles that have been moistened from the shredded paper particle line after the steam operation to a bonded fiber/cellulose product line wherein the portion of the shredded paper particles being diverted comprises less than all of the shredded paper particles being produced at the shredded paper particle line such that the shredded paper particle line forms an in-process production and delivery of the shredded paper particles to the bonded fiber/cellulose product line; and producing bonded fiber/cellulose insulation products, which contains fire retardant, with the bonded fiber/cellulose product line from the diverted portion of shredded paper particles;

said shredded paper particles that are not diverted to the bonded fiber/cellulose product line comprising loose cellulose insulation, which contains fire retardant, produced by the shredded paper particle line.

2. The method according to claim 1, wherein said diverting includes pneumatically transferring the shredded paper particles to the bonded fiber/cellulose product line.

3. The method according to claim 2, wherein the steam operation of the shredded paper particle line comprises a steam conveyor.

4. The method according to claim 2, wherein the bonded fiber/cellulose product line includes an agitator and wherein said diverting includes delivering the shredded paper particles from the shredded paper particle line to the agitator to maintain the shredded paper particles in an aerated condition prior to producing bonded fiber/cellulose insulation products.

5. The method according to claim 4, wherein the agitator is combined with a metering and weighing device.

6. The method according to claim 1, wherein said making shredded paper particles includes making the shredded paper particles with a substantially known quality of paper; and said producing bonded fiber/cellulose insulation products includes controlling the amount and/or type of bonding materials utilized as part of said producing bonded fiber/cellulose insulation products based on the substantially known quality of paper in the shredded paper particles.

7. The method according to claim 6, wherein said diverting includes pneumatically transferring the shredded paper particles to the bonded fiber/cellulose product line.

8. The method according to claim 1, wherein the bonded fiber/cellulose product line includes an agitator and wherein said diverting includes delivering the shredded paper particles from the shredded paper particle line to the agitator to maintain the shredded paper particles in an aerated condition prior to producing bonded fiber/cellulose insulation products.

9. The method according to claim 8, wherein the agitator is combined with a metering and weighing device.

10. The method according to claim 8, wherein the steam operation of the shredded paper particle line comprises a steam conveyor.

11. The method according to claim 1, wherein said producing bonded fiber/cellulose insulation products comprises providing bonding materials, and blending a controlled amount of the diverted portion of the shredded paper particles with a controlled amount of the bonding materials.

12. The method according to claim 11, further comprising mixing measured amounts of the blend to form a mixture with controlled amounts of shredded paper particles and bonding materials.

13. The method according to claim 12, wherein said producing bonded fiber/cellulose insulation products includes forming a batt from a controlled amount of the mixture, heating the batt, and compressing the heated batt to form a bonded fiber/cellulose insulation product.

14. The method according to claim 12, wherein said providing bonding material includes providing bonding fibers and/or structural fibers.

15. The method according to claim 1, wherein no fire retardant material is added at the bonded/fiber cellulose product line.

16. The method according to claim 1, wherein said shredded paper particle line includes a bagging station whereat the loose cellulose insulation is packaged.

17. The method according to claim 1, wherein the bonded fiber/cellulose product line includes a first agitator and a second agitator, and wherein said diverting includes delivering the shredded paper particles from the shredded paper particle line to the first agitator to maintain the shredded paper particles in an aerated condition prior to producing bonded fiber/cellulose insulation products, and wherein said producing bonded fiber/cellulose insulation products comprises providing bonding materials in the second agitator to maintain the bonding materials in an aerated condition and blending a controlled amount of the diverted portion of the shredded paper particles from the first agitator with a controlled amount of the bonding materials from the second agitator.

18. The method according to claim 17, wherein the first agitator is combined with a metering and weighing device and the second agitator is combined with a metering and weighing device.

19. The method according to claim 1, wherein the shredded paper particle line includes a first shredding operation and a second shredding operation, with the second shredding operation including a refiner, and wherein said making shredded paper particles includes pre-shredding paper at the first shredding operation to form pre-shredded paper, delivering the pre-shredded paper to the second shredding operation, and fiberizing the pre-shredded paper in the refiner at the second shredding operation to form shredded paper particles.

20. The method according to claim 19, wherein the first shredding operation includes a hammer-mill, and wherein said pre-shredding paper at the first shredding operation includes pre-shredding paper with the hammer-mill.

21. The method according to claim 1, wherein the shredded paper particle line includes a first shredding operation and a second shredding operation, with the second shredding operation including a refiner, and wherein said making shredded paper particles includes pre-shredding paper at the first shredding operation to form pre-shredded paper, delivering the pre-shredded paper to the second shredding operation, and fiberizing the pre-shredded paper in the refiner at the second shredding operation to form shredded paper particles.

22. The method according to claim 21, wherein said diverting includes pneumatically transferring the shredded paper particles to the bonded fiber/cellulose product line.

23. The method according to claim 1, wherein the shredded paper particles are moistened at the steam operation to have a moisture content in the range of about 11% to 13%.

24. A method of providing shredded paper particles comprising:
    making shredded paper particles in a shredded paper particle line that includes a steam operation and a refiner, said making shredded paper particles including shredding paper with the refiner to form shredded paper particles, adding fire retardant material in the shredded paper particle line, and applying heated steam to the shredded paper particles at the steam operation after applying the fire retardant material whereby the shredded paper particles are moistened; and
    diverting a portion of the shredded paper particles after the steam operation to a bonded fiber/cellulose product line wherein the shredded paper particle line forms an in-process production and delivery of the shredded paper particles that have been moistened to the bonded fiber/cellulose product line.

25. The method according to claim 24, wherein said diverting includes pneumatically transferring the shredded paper particles to the bonded fiber/cellulose product line.

26. A system for producing both loose cellulose insulation and bonded fiber/cellulose insulation products comprising:
    a shredded paper product line, said shredded paper product line including a paper shredder, a heated steam operation, and a packaging station;
    a transfer system; and
    a bonded fiber/cellulose product line for producing bonded fiber/cellulose insulation products, said bonded fiber/cellulose product line having an input and being operatively connected to said shredded paper product line at said input whereby said bonded fiber/cellulose product line may receive shredded paper particles produced at said shredded paper product line;
    said transfer system being operable (1) to transport moistened shredded paper particles from said shredded paper product line after said heated steam operation to said input of said bonded fiber/cellulose product line whereat the shredded paper particles are used to produce bonded/fiber cellulose insulation products and/or (2) to transport shredded paper particles from said shredded paper product line to said packaging station whereat the shredded paper particles are packaged as loose cellulose insulation.

27. The system of claim 26 wherein said transfer system includes a fan, said fan being operable to pneumatically transport shredded paper particles to said packaging station and said input of said bonded fiber/cellulose product line.

28. The system of claim 27 wherein said bonded fiber/cellulose product line includes a forming station for producing bonded fiber/cellulose insulation products.

29. The system of claim 28, wherein said input of said bonded fiber/cellulose product line includes a metering and weighing device that receives shredded paper particles from said shredded paper product line.

30. The system of claim 29, wherein said metering and weighing device includes an agitator to maintain the shredded paper particles in an aerated condition.

31. A method of producing both loose cellulose insulation and bonded fiber/cellulose insulation products utilizing shredded paper particles comprising:
    making shredded paper particles in a shredded paper particle line, said making shredded paper particles including shredding paper to form shredded paper particles, and adding fire retardant material and moisture in the shredded paper particle line to form moistened shredded paper particles;
    diverting a portion of the moistened shredded paper particles from the shredded paper particle line to a bonded fiber/cellulose product line wherein the shredded paper particle line forms an in-process production and delivery of moistened shredded paper particles to the bonded fiber/cellulose product line;
    producing bonded fiber/cellulose insulation products, which contains fire retardant, with the bonded fiber/cellulose product line from the diverted portion of moistened shredded paper particles; and
    drying the moistened shredded paper particles that are not diverted to the bonded fiber/cellulose product line to form loose cellulose insulation, which contains fire retardant, produced by the shredded paper particle line.

* * * * *